United States Patent [19]
Loder

[11] Patent Number: 5,423,408
[45] Date of Patent: Jun. 13, 1995

[54] MOVING WALKWAY

[75] Inventor: John L. Loder, Hawthorn, Australia

[73] Assignee: Loderway Pty. Ltd., Hawthron, Australia

[21] Appl. No.: 137,101

[22] PCT Filed: Apr. 13, 1992

[86] PCT No.: PCT/AU92/00162
§ 371 Date: Mar. 7, 1994
§ 102(e) Date: Mar. 7, 1994

[87] PCT Pub. No.: WO92/18414
PCT Pub. Date: Oct. 29, 1992

[30] Foreign Application Priority Data

Apr. 18, 1991 [AU] Australia .......................... PK567/91
Jul. 16, 1991 [AU] Australia .......................... PK7221/91
Oct. 11, 1991 [AU] Australia .......................... PK8821/91

[51] Int. Cl.6 .............................................. B65G 7/66
[52] U.S. Cl. ...................................... 198/324; 198/635; 198/638
[58] Field of Search ................. 198/324, 325, 635, 638

[56] References Cited

U.S. PATENT DOCUMENTS 2,782,896  2/1957  Kendall et al. ..................... 198/324
2,862,599  12/1958 Sinden et al. ...................... 198/324
3,132,733  5/1964  Boman et al. ...................... 198/324
5,044,485  9/1991  Loder ................................. 198/325
5,234,095  8/1993  Patin ................................. 198/324

FOREIGN PATENT DOCUMENTS 787842  12/1957  United Kingdom .

Primary Examiner—Joseph E. Valenza
Attorney, Agent, or Firm—Seed and Berry

[57] ABSTRACT

A moving walkway comprising at least one flat slider belt (6) entrained around rollers (8) and a termination plate (2) at the discharge end of the belt (6). The termination plate (2) may be an end plate or a transfer plate. The configuration of the termination plate (2) is such in relation to the speed of the belt (6) and diameter of the end roller (8) that an object travelling at the speed of the belt and leaving the belt will strike the plate at a position downstream of the leading edge (4) of the plate. The leading edge (4) of the plate is so shaped that it defines with the adjacent portion of the belt (6) a nip (10) of small depth in a vertical direction and which permits easy removal of any material which might happen to become ingested into the gap between the leading edge (4) of the plate (2) and the belt (6).

8 Claims, 3 Drawing Sheets

MOVING WALKWAY

TECHNICAL FIELD

This invention relates to moving walkways and more particularly walkways of the type which consist of belts.

BACKGROUND OF THE INVENTION

Previously proposed moving walkways of the type consisting of flat belts have used thick belts (typically of a thickness of 20 mm to 30 mm) which returned about large diameter rollers (typically of the order of 600 mm) and at their terminations had end plates which were straight edged and which lay transversely across the width of the belt. In order to provide as smooth an exit surface as possible the edge of the end plate was kept as close as possible to the tangent point of the belt, consistent with the necessity of achieving adequate strength of the end plate in a vertical direction, and the need to radius the edge of the plate so it did not present a knife-like edge. In order to achieve these aims the underside of the end plate closely followed the radius of the belt surface for some distance so that there was a relatively long narrow slot, in the direction of movement, between the two surfaces. This provided strength in a vertical direction and it was also believed that this arrangement would inhibit ingestion of flexible material. In practice, this was not the case and thin material, under pressure from above, could pass between the belt and the end plate and become caught. Because of the relatively large surface area, where the material was pressed by the underside of the end plate against the ingoing belt surface, any material so caught could suffer quite a strong ingesting force. In addition, any material being pulled vertically by the user, in an attempt to extract a piece of clothing for example, was required to turn over the edge of the end plate through an acute angle of approximately 70 degrees. If the pulling force was horizontal the angle increased to about 160 degrees. These acute angles considerably increased the difficulty of extraction. In one case, in 1960, a small girl sitting on a belt having end plates of this type had her dress ingested so tightly that not only could she not release herself, she was in fact killed by the tightened material.

In order to overcome this problem the now universally used ribbed belt having end combs was adopted. In this arrangement, the combs enter the spaces between the ribs so there is no substantial width of end plate which can ingest fabric as had previously been the case. However, it has been found that the frayed soles of modern footwear, shoelaces and the like can be caught in the comb and the heels of high-heeled shoes may enter between the belt ribs and impact on the end of the comb often tearing off the heel and this can cause a wearer to fall. Also, comb teeth can become broken and this can exacerbate the difficulties and on a number of occasions have removed fingers and toes of children. Most accidents on current moving walkways involve the ribs and combs at the exit point.

SUMMARY OF THE INVENTION

According to one aspect of the present invention, there is provided a walkway comprising at least one fiat belt entrained around rollers, and a termination plate at the discharge end of the belt, the termination plate having a substantially straight leading edge which lies closely adjacent to the surface of the belt at a position at which the belt passes around a said roller at the discharge end, the position and configuration of the end plate being such that a body leaving the belt at the discharge end and travelling at substantially the speed of the belt and falling under the acceleration of gravity will strike the top surface of the plate downstream of the point of closest juxtaposition of the belt and the plate, wherein the leading edge portion of the plate is so shaped that the edge portion defines with the adjacent portion of the belt a nip of small depth in a vertical direction.

According to another aspect of the invention, there is provided a walkway comprising a succession of substantially fiat belts, said walkway including at least one accelerating section, said accelerating section comprising at least one relatively short belt leading to a faster moving longer belt, and a first handrail associated with the accelerating section, the handrail moving at the speed of the longer belt, the speed and length of the short belt being such that substantially no passenger will reach a state of imbalance requiring correction by foot movement.

BRIEF DESCRIPTION OF THE DRAWINGS

Embodiments of the invention will now be described by way of example only with reference to the accompanying drawings, in which.

DETAILED DESCRIPTION OF THE INVENTION

The walkway with which the invention can be most readily used has thin flat slider belts (generally less than 5 mm) passing about rollers having a small diameter. A typical diameter of roller, although this is not restrictive, is approximately from 30 mm to 70 mm, with a diameter of the order of 30 mm being preferred. It is however to be understood that the principles disclosed are also applicable when larger diameter rollers are used, say, rollers of up to about 150 mm. One aspect of the invention relates to a termination adjacent the end of the belt. The termination may be an end plate at the exit end of the walkway, or a transfer plate between two adjacent belts of the walkway. However for convenience in the remainder of the description we shall refer to it, simply, as an end plate.

Figure 1:
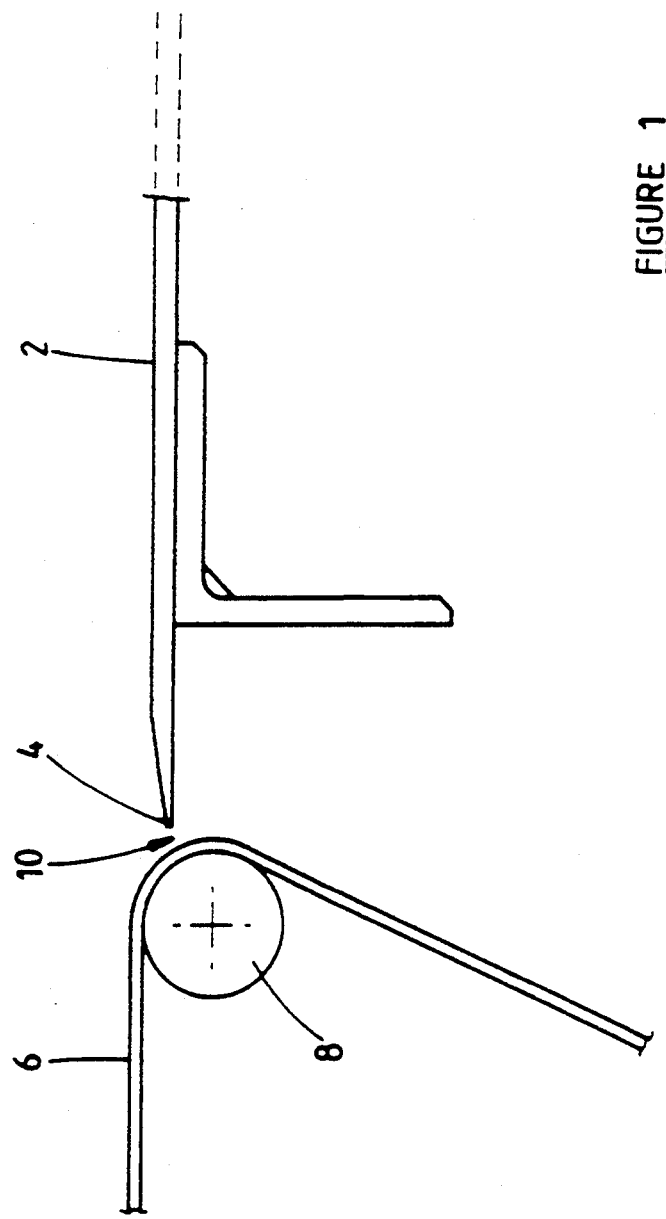
FIG. 1 is a schematic side view of one embodiment of a termination at an end of a belt of a walkway.

With initial reference to FIG. 1, the end plate 2 is located so that a leading edge 4 of the end plate 2 is adjacent the belt 6 and lies transversely across the width of the belt, with there being only a small gap between the belt 6 and the leading edge 4 of the end plate 2. The leading edge 4 is substantially straight as viewed from above. The end plate 2 is so located relative to the belt 6 that, for a given design speed of the belt, the diameter of the end roller 8 about which the belt 6 returns, and the shape of the end plate 2, a solid body leaving the belt 6 will, when travelling at approximately the speed of the belt and falling under the force of gravity, land on the upper surface of the end plate 2 past the point of closest juxtaposition of the end plate 2 and the belt 6. Thus, no solid body having a speed substantially equal to the speed of the belt 6 and falling under the acceleration of gravity, can enter the space between the belt 6 and the end plate 2. In practice this can be achieved by locating at least the leading edge 4 of the end plate 2 at a position below the continuation of the plane of the upper surface of the belt 6, the distance below the plane depending upon the necessary parameters set out hereinabove. This configuration may be achieved by slightly curving or inclining downwardly the leading end portion of the end plate 2 with the downstream portions of the plate 2 lying in a continuation of the plane of the upper surface of the belt; alternatively, these downstream portions may be below the continuation of the plane.

With such an arrangement, the feet of a passenger travelling on the belt will be delivered onto the end plate, even if the passenger does not step from the belt. It will be seen that even if a passenger is sitting on the belt 6, or an object is resting on the belt 6, it will normally be carried over the point of juxtaposition to the end plate 2. For example, the free end of a scarf or a belt or a child's dress, should the child be sitting on the belt, would be carried forwardly onto the end plate and not contact the juxtaposition between the belt and the end plate. There is, however, a possibility that an article might be forced downwardly in a manner which would not be achieved under the acceleration of gravity, for example where a child's dress is located beneath the bottom of a child who comes to rest over the end plate 2. To meet this possibility, the shape of the leading end portion of the end plate 2 is such as to minimise any possible damage or likelihood of injury in such a case. This is achieved by shaping the underside of the end plate 2 at least at the leading end portion of the plate so that rather than follow the path of the belt 6 as was the case in previous designs, the plate 2 is cut away from the belt 6 so that a nip 10 of only a small vertical depth is defined between the leading edge 4 of the plate 2 and the belt 6.

As mentioned in the introduction hereto, one of the difficulties with the original flat belt construction was that in order to give vertical strength to the end plate, because the belt turns about a large diameter roller, the end plate had to follow the belt for a substantial distance to obtain the necessary thickness to provide this strength. This requirement resulted from the large span needed for the end plate to reach to a position adjacent to the belt. In the present case, because the diameter of the end roller 8 is small, the span required for the end plate 2 to reach the belt 6 is considerably reduced and the end plate can be cut away rapidly whilst still giving quite sufficient mechanical strength to bear the required vertical loads.

Due to the small vertical depth of the nip 10 between the belt 6 and end plate 2 the area over which there is likely to be contact between any article passing between the belt 6 and the end plate 2 will be very small, as typically, the vertical length of the contact area will be of the order of a few millimeters or less, rather than over tens of millimeters as was the case with previous designs. With this arrangement there is unlikely to be any wedging of material in the area between the belt 6 and the end plate 2, and the degree of inward force generated between the material and the end plate 2 and the belt 6 is small. Thus, not only is it rather difficult to cause any material to enter the space between the belt 6 and the end plate 2, it is also relatively easy to remove this material if it is in the space between the two, as at any time the force attempting to feed further material into the space is limited by the effective area over which the material is in contact. In addition, when pulled vertically the material only needs to turn through about 20 degrees over the edge 4 of the end plate 2, or if horizontally through about 110 degrees, compared to the 70 and 160 degrees of earlier designs. Withdrawal will be made easier if the leading edge 4 of the end plate 2 approaches the belt 6 perpendicularly to the tangent at the belt surface at the point of a closest juxtaposition. This has been confirmed experimentally.

The leading edge 4 of the end plate 2 is radiused, so as to form a convex profile in vertical section rather than sharp. We have considered the variables introduced by variation in the radius of the leading edge 4 of the end plate 2, as it would appear that the larger the radius the less likelihood of material which is being withdrawn being caught on the edge 4 of the plate whilst, on the other hand, a smaller radius reduces the likely wedging action between the belt and edge surfaces, and also reduces the effective area of pinching which is where the ingestion force is generated. We have found that, on balance, a radius of less than 2.0 mm is preferred. We also prefer to polish the radiused edge so that this will reduce both the ingestion force on any material and the resistance to withdrawal of ingested material.

In an embodiment shown, the nip 10 of small depth between the leading edge 4 of the plate 2 and the belt is formed by making the leading end portion of the plate relatively thin. However, it is not essential to form the nip 10 in this way. The plate 2 can be thicker than that illustrated and with thicker plates we have determined that the leading edge of the plate should be inclined away from the belt 6 over the thickness of the leading edge from the top to the bottom surface of the plate at such a rate that the gap between the belt 6 and leading edge at least doubles with every 10 mm of thickness.

Figure 2:
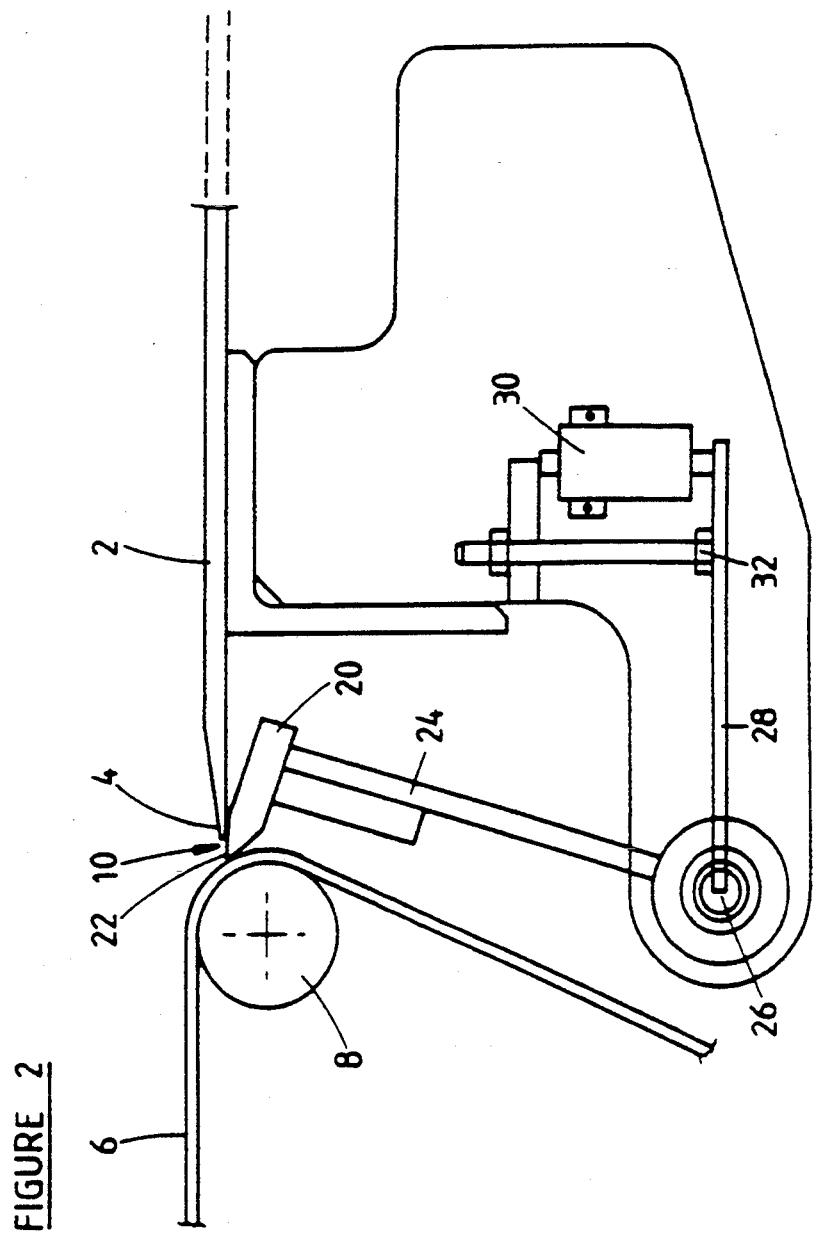
FIG. 2 is a schematic side view similar to FIG. 1, but showing a modified arrangement.

The embodiment shown in FIG. 2 incorporates an end plate 2 constructed in accordance with the principles described in relation to FIG. 1 but additionally incorporates means to make ingestion in the nip 10 between the end plate 2 and belt 6 more difficult, withdrawal easier and also to stop the system if ingestion does take place, even for a short period.

Experimental work has shown that while ordinary flexible material may readily be withdrawn using an end plate configuration as described in relation to FIG. 1, compressible material, such as the worn sole of rubber footwear, if ingested, requires a significant force to withdraw it. Although, in practice, it is extremely difficult to achieve ingestion of compressible material, nevertheless it is desirable to provide provision against occurrence of this possibility, however remote it might be.

As shown in FIG. 2, a movable plate 20 is mounted directly beneath the end plate 2 to substantially close from below the gap between the leading edge 4 of the end plate 2 and the belt 6. The leading edge 22 of the movable plate 20 is itself shaped in a similar way to that of the end plate 2. The movable plate 20 is carried at the upper end of an arm 24 which is pivotally mounted at its lower end at a pivot assembly 26 spaced a substantial distance beneath the end plate 2 so that the movable plate 20 is able to pivot between a rest position in which its leading edge 22 is closely adjacent the belt 6 whereby the gap between the end plate 2 and the belt 6 is closed from below, and a position away from the belt. The arm 24 is subject to a spring bias, for example provided by a torsion spring associated with the pivot assembly 26, to locate the leading edge 22 of the movable plate 20 in its rest position very close to the belt 6 whereby the leading edge 22 is almost touching the belt 6. The exact rest position of the movable plate 20 relative to the belt 6 can be determined by an adjustable stop. With this arrangement, material is unable to become ingested without passing between the very small gap which exists between the movable plate 20 and the belt 6 and the presence of the movable plate 20 effectively prevents the ingestion of compressible material as discussed previously. The spring bias applied to the movable plate 20 is relatively light so that the movable plate 20 can easily be displaced and this facilitates withdrawal of any material which might be ingested. The pivot assembly 26 is located forwardly of a vertical plane passing through the leading edge 4 of the plate 2 so that movement of the plate 20 away from the belt 6 also results in downwards movement of the upper surface of the plate 20 away from the lower surface of the plate 2. Accordingly any debris which builds up on the plate 20 beneath the gap will not inhibit the movement of the plate 20 away from the belt 6.

It is preferred that the movable plate 20 is combined with a switch mechanism so that if the plate 20 is subject to substantial displacement away from the belt 6 as a result of ingestion occurring, the drive for the belt is automatically switched off and withdrawal can easily take place. As shown in FIG. 2 this is achieved by mounting a switch arm 28 for rotation with the supporting arm 24. The switch arm 28 is associated with a switch 30 and in the normal rest position of the plate 20 adjacent to the belt 6 the switch arm 28 holds the switch 30 in a closed state. Movement of the plate 20 away from the belt 6 consequent on ingestion occurring moves the switch arm 28 downwardly away from the switch 30 whereby the switch 30 triggers to an open state and the drive for the belt 6 stops. The switch arm 28 is engageable with an adjustable stop 32 which is shown by way of example in the form of a bolt which can be adjusted to set the normal rest position of the plate 20 closely adjacent to the belt 6. Preferably the switch 30 is also adjustable in position relative to the switch arm 28 in order to vary the sensitivity of the mechanism to thereby permit variation in the extent of movement of the plate 20 away from the belt 6 before the switch 30 is triggered. However the distance over which the plate 20 moves away from the belt 6 before the switch 30 is triggered must be no more than the width of the nip 10.

A dual plate system as described with reference to FIG. 2 is not only applicable for use with belts which pass over small diameter rollers, but also to belts which pass over larger diameter rollers. In situations where the belt runs over long distances, particularly where an incline is involved, a thicker gauge belt may be required and this will result in the need for larger diameter return rollers at the ends of the belt. As the diameter of the return roller increases, the trajectory of an object moving from the end of the belt onto the end plate changes. When the leading edge of the end plate 2 is configured to create a nip of relatively small depth with the end of the belt as generally described in relation to FIG. 1, the increase in roller diameter and consequent alteration of the trajectory of a body moving onto the end plate might under some circumstances result in, for example, a high heel of a shoe engaging against the leading edge of the end plate. The presence of the movable plate to close the gap from beneath will prevent a high heel or other object from moving through the gap, but if the circumstances are such that the object causes displacement of the plate 20 beyond predetermined limits according to the parameters of the switching mechanism, the movement of the plate 20 will result in stopping of the drive.

Another aspect of the invention seeks to minimise the upsetting effects of acceleration on a walkway of the type which uses a sequence of successive belts which travel at different speeds to accelerate a passenger in stages to a higher speed. Successful operation of a system using accelerating sections requires proper coordination between the belts and moving handrails. Codes of practice require a restricted differential movement between the feet and hands of a passenger during the use of any one handrail. In the relevant U.S. code, this differential movement must not exceed 400 mm. It is also desirable from the stand-point of passenger comfort to provide a minimum number of handrail changes. Acceleration is more difficult for a passenger to counteract than deceleration basically because the human foot projects forward from the centreline of the leg to the toes by more than four times the distance from the centreline to the back of the heel. Acceleration can rock a person onto the heels whereby balance can easily be lost, whereas deceleration will cause rocking onto the toes and arching of the foot can readily result in restoration of balance. If an accelerating section of a walkway is associated with a change of handrail from one handrail to a faster handrail, substantial passenger instability may result in this section.

The aspect of the invention now to be described results in a system of accelerating belts and associated handrails which minimises handrail changes and minimises passenger instability during acceleration.

Figure 3:
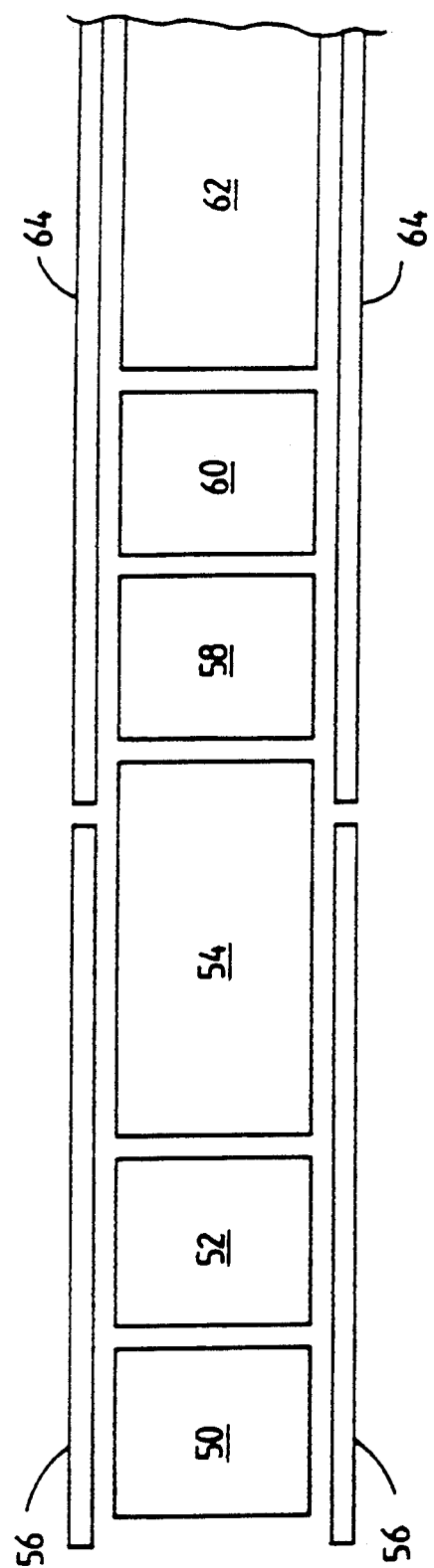
FIG. 3 is a schematic plan view of an arrangement of belts and handrails in an accelerating section of a walkway.

With reference to FIG. 3, an accelerating section comprises two relatively short initial belts 50, 52, with the second belt 52 travelling at a speed higher than the first belt 50, and a third, longer, belt 54 travelling at a higher speed than the second belt 52. The three belts are associated with a handrail 56 which moves at the speed of the third belt 54. In contrast, conventional theory of accelerating sections in walkways suggested that the handrail should move at the average speed of the belts in any particular section. This leads to the disadvantage that in the fastest section, the handrail lags behind the belt thereby creating a tendency for the passenger to rock back onto a destabilising position on the heels. By using relatively short belts at the start of an accelerating section, the forward momentum of a passenger walking onto the first belt 50 will itself engender stability and this can be used to offset the destabilising effects of acceleration. By making the first and second belts 50, 52 sufficiently short, for an average passenger only the first foot will land on the first belt 50 and the second foot will not touch the belts until the first foot has been transferred to the second belt 52. At that time the two feet of the passenger may be more or less side-by-side and it is in this state that the passenger is most prone to imbalance. However the passenger is then immediately transferred to the third, longer, belt 54. When on the longer belt 54 the passenger is able to retain his balance by moving one foot behind the other with the certainty that both feet will be moving at the same speed. In summary, the length of the first and second belts 50, 52 is sufficiently shorter than the time required to induce, in all but a very small minority of passengers a state of instability requiring foot movement for correction, at least until the passenger has reached the third belt 54. In practice, this can be achieved if the transit time on the first and second belts is no more than about 1 second on each belt.

As described earlier, the handrail 56 associated with the three belts is travelling at the speed of the fastest belt 54. Accordingly, when the passenger is transferred onto the second belt 52 while holding the handrail 56, although the passenger's feet might assume on the second belt 52 a position at which instability can occur, the handrail 56 is moving faster than the second belt 52 and will therefore tend to pull the passenger forwards into a stable position. However, due to the relatively short lengths of the first and second belts 50. 52, despite the difference in speed between the handrail 56 and the first two belts, the differential movement between the hands and the feet can be easily maintained within limits required by codes of practice without having to change handrails. When the passenger is on the third belt 54 the handrail 56 and belt 54 will be travelling at the same speed and hence no differential movement will result. Accordingly, the third belt 54 and handrail 56 can extend over any required distance sufficient to enable a passenger to fully recover stability on the third belt 54 while still maintaining hold of the handrail 56.

The third belt 54 may then lead onto a further accelerating section comprising two further short belts 58, 60 and then onto a main belt 62 travelling at the required higher speed. The length considerations of the belts 58, 60 correspond to those of the belts 50, 52 as discussed above in order to prevent instability on these belts. A second handrail 64 travelling at the speed of the main belt 62 extends over part of the length of the third belt 54 and also over the two shorter accelerating belts 58, 60 after the third belt 54. The changeover from the first handrail 56 to the second handrail 64 occurs while the passenger is on the third belt 54 after a time of transit on the third belt 54 sufficient to have enabled a passenger to have regained stability after movement from the second to the third belt. We have determined that the change in handrails on the third belt 54 should not take place until there has occurred at least about one second of travelling time of a passenger on the third belt 54. Correction of balance is an instinctive reaction and a travelling time of at least about one second on the third belt 54 is necessary for passengers to regain their balance on the third belt before change of handrails occurs. The table below indicates, by way of example, the speed, belt length and transit time in the sequence of two accelerating sections as described above. In this configuration, the first handrail 56 will be travelling at the speed of the third belt 54 which in the example shown is 1.2 m/s and the second handrail 64 will be travelling at the speed of the main belt 62 which in the example shown in 1.6 m/s.

|  | SPEED m/s | LENGTH m | TIME s |
| --- | --- | --- | --- |
| 1st Belt | 0.7 | 0.5 | 0.71 |
| 2nd Belt | 1.0 | 0.5 | 0.5 |
| 3rd Belt | 1.2 | 2.5 | 2.08 |
| 4th Belt | 1.35 | 0.5 | 0.37 |
| 5th Belt | 1.5 | 0.5 | 0.33 |
| 6th Belt (main belt) | 1.6 | as required | — |

If higher speeds are required, further accelerating sections will be added, each comprising two short belts followed by a longer belt with the associated handrail moving at the speed of the longer belt. The main belt carries passengers to the far end of the system at which a succession of progressively slower belts decelerates the passengers to a speed at which they may comfortably and safely step off the system.

The belts are preferably thin flexible belts which pass over small diameter rollers, and the moving handrails are of continuous form.

Although as described, each of the accelerating sections has two shorter belts followed by a longer belt, it is possible for the accelerating section to comprise just one short belt followed by a longer belt, or more than two belts followed by a longer belt. The principles disclosed above are, however, still applicable; in particular, the transit time on the or each of the shorter belts should be no more than about 1 second per belt, the handrail moves at the speed of the longer belt, and no change of handrail on the longer belt will occur until at least about 1 second of travelling time on the longer belt.

The configuration described provides good passenger comfort and safety during the acceleration phases while providing a minimum of handrail changes and permitting operation within codes of practice which determine maximum differential movement between the hands and feet.

The embodiments have been described by way of example only and modifications are possible within the scope of the invention.

I claim:

1. A walkway comprising at least one flat belt entrained around rollers, and a termination plate at the discharge end of the belt, the termination plate being rigidly fixed in a selected position relative to the flat belt, the termination plate having a substantially straight leading edge which lies closely adjacent to the surface of the belt at a position at which the belt passes around said roller at the discharge end, the roller at the discharge end having a predetermined radius and the belt passes around the rollers at a selected speed, the position and configuration of tile end plate being such, in relation to the speed of the belt and radius of said roller, that a body leaving the belt at the discharge end and traveling at substantially the speed of the belt and falling under the acceleration of gravity will strike the top surface of the plate downstream of the point of closest juxtaposition of the belt and the plate, wherein the leading edge portion of the plate is so shaped that the edge portion defines with the adjacent portion of the belt a nip of small depth in a vertical direction.

2. A walkway according to claim 1, wherein the leading edge portion of the plate has a thickness not exceeding a few millimeters and the leading edge is of a convexly curved profile in vertical section.

3. A walkway according to claim 1, wherein the leading edge of the plate is inclined away from the belt over the thickness of the leading edge from the top to the bottom surface of the plate at such a rate that the gap between the belt and the leading edge at least doubles per 10 mm of thickness.

4. A walkway according to claim 1 further comprising a movable plate located directly beneath the leading edge of the termination plate, said movable plate having a leading edge which, when the movable plate is in a rest position, lies closer to the belt than does the leading edge of the termination plate whereby when in the rest position the movable plate substantially closes from below the gap formed by said nip, the movable plate being biased into said rest position and being movable away from said rest position in the event of ingestion of material between the movable plate and the belt.

5. A walkway according to claim 4, wherein the movable plate is mounted for pivotal movement about a substantially horizontal pivot axis at a position below the movable plate, the pivot axis being so located that movement of the movable plate away from the belt also results in downwards movement of an upper surface of the plate away from a lower surface of the termination plate.

6. A walkway according to claim 4, further comprising switch means responsive to movement of the movable plate away from its rest position whereby to cause stoppage of the belt.

7. A walkway according to claim 6, wherein the switch means is activated by a movement of the movable plate away from the belt a distance not greater than the distance between the leading edge of the termination plate and the belt.

8. A walkway according to claim 5, comprising adjustable stop means for adjusting the rest position of the movable plate.

* * * * *

UNITED STATES PATENT AND TRADEMARK OFFICE
CERTIFICATE OF CORRECTION

PATENT NO. : 5,423,408
DATED : June 13, 1995
INVENTOR(S) : John L. Loder

It is certified that error appears in the above-indentified patent and that said Letters Patent is hereby corrected as shown below:

On the cover page, item [73], please change address of Assignee from "Hawthron, Australia" to -- Hawthorn, Australia --.

On the cover page, item [86], please change the corresponding PCT Application Number from "PCT/AU92/00162" to -- PCT/AU92/00163 --.

Signed and Sealed this

Nineteenth Day of December, 1995

Attest:

BRUCE LEHMAN

Attesting Officer        Commissioner of Patents and Trademarks

UNITED STATES PATENT AND TRADEMARK OFFICE
CERTIFICATE OF CORRECTION

PATENT NO. : 5,423,408
DATED : June 13, 1995
INVENTOR(S) : John L. Loder

It is certified that error appears in the above-indentified patent and that said Letters Patent is hereby corrected as shown below:

Title page, item [30], delete "PK567/91" and substitute therefor-- PK5671/91 --.

Signed and Sealed this

Thirtieth Day of January, 1996

Attest:

BRUCE LEHMAN

*Attesting Officer*  *Commissioner of Patents and Trademarks*